United States Patent
Mertes et al.

(10) Patent No.: US 12,097,967 B2
(45) Date of Patent: Sep. 24, 2024

(54) FASTENING SYSTEM FOR AN AIRCRAFT CONFIGURED TO FASTEN AT LEAST ONE TANK INTENDED TO CONTAIN LIQUID HYDROGEN

(71) Applicant: Airbus Operations SAS, Toulouse (FR)

(72) Inventors: Anthony Mertes, Toulouse (FR); Jérôme Phalippou, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/140,153

(22) Filed: Apr. 27, 2023

(65) Prior Publication Data

US 2023/0382550 A1 Nov. 30, 2023

(30) Foreign Application Priority Data

May 31, 2022 (FR) ...................................... 2205214

(51) Int. Cl.
*B64D 37/04* (2006.01)
(52) U.S. Cl.
CPC .................................. *B64D 37/04* (2013.01)
(58) Field of Classification Search
CPC ......... B64D 37/04; B64D 37/30; B64D 37/00
See application file for complete search history.

(56) References Cited

U.S. PATENT DOCUMENTS

| | | | |
|---|---|---|---|
| 2004/0217231 A1 | 11/2004 | D' Auvergne | |
| 2020/0377180 A1 | 12/2020 | Yu et al. | |
| 2022/0074548 A1 | 3/2022 | Clarke et al. | |
| 2023/0339593 A1* | 10/2023 | Lopez-Herrero | ...... B64D 37/04 |

FOREIGN PATENT DOCUMENTS

| | | | | |
|---|---|---|---|---|
| CN | 110510128 A | * | 11/2019 | ............. B64C 15/02 |
| DE | 10324180 B3 | | 9/2004 | |
| FR | 3055305 A1 | | 3/2018 | |
| WO | WO-2023074870 A1 | * | 5/2023 | |

OTHER PUBLICATIONS

French Search Report for Application No. FR 2205214 dated Jan. 13, 2023, 2 pages. [See p. 1, categorizing the cited references].

\* cited by examiner

*Primary Examiner* — Richard Green
*Assistant Examiner* — Ashesh Dangol
(74) *Attorney, Agent, or Firm* — Lerner David LLP (57) ABSTRACT

A fastening system for an aircraft configured to fasten at least one tank intended to contain liquid hydrogen includes a longitudinal box, an upper structure fastened to an upper side of the longitudinal box, a lower structure fastened to a lower side of the longitudinal box and at least two fastening frames including, on either side of the vertical plane of symmetry (P1), a fastening device for connecting a tank to the upper structure. The fastening system further includes at least two fastening devices for connecting a fastening point of the tank to the longitudinal box and at least two fastening devices for connecting a fastening point of the tank to the lower structure. The fastening system makes it possible to securely fasten at least one hydrogen tank on board an aircraft (AC).

15 Claims, 5 Drawing Sheets

Fig. 10

FASTENING SYSTEM FOR AN AIRCRAFT CONFIGURED TO FASTEN AT LEAST ONE TANK INTENDED TO CONTAIN LIQUID HYDROGEN

FIELD OF THE INVENTION

The present invention relates to a fastening system for an aircraft configured to fasten at least one tank intended to contain liquid hydrogen.

BACKGROUND OF THE INVENTION

In order to move, an aircraft comprises propulsion systems comprising at least one engine. The propulsion systems may correspond to turbojet engines or turboprop engines in which an engine drives a propeller in rotation.

The engines of these propulsion systems may correspond to internal combustion engines supplied by liquid hydrogen. These engines may also correspond to electric motors supplied by fuel cells. In order to power these engines, it is necessary to install liquid hydrogen tanks.

These tanks may be installed one next the other in a fuselage portion of the aircraft. To be installed on board the aircraft, the tanks have to be fastened securely.

BRIEF SUMMARY OF THE INVENTION

The object of the present invention is to provide a solution for the fastening of tanks installed on board the aircraft. To this end, the present invention relates to a fastening system configured to fasten at least one tank intended to contain liquid hydrogen, the tank or tanks having a center of gravity, the fastening system being intended to be integrated into a fuselage body of an aircraft, the fastening system having a vertical plane of symmetry, the fastening system being linked to an orthogonal frame of reference defined by an axis X intended to be parallel to a longitudinal axis of the fuselage body, a horizontal axis Y and a vertical axis Z.

According to the invention, the fastening system comprises:
- a longitudinal box extending parallel to the axis X, the longitudinal box having a longitudinal vertical median plane that is coincident with the vertical plane of symmetry of the fastening system, the longitudinal box having a horizontal median plane intended to comprise the center of gravity of the tank or tanks, the longitudinal box comprising at least two longitudinal plates that are parallel to the vertical plane of symmetry,
- an upper structure fastened to an upper side of the longitudinal box,
- a lower structure fastened to a lower side of the longitudinal box,
- at least two fastening frames distributed along the axis X, each of the at least two fastening frames comprising symmetrically, on either side of the vertical plane of symmetry, two first fastening devices that are configured to connect a tank to the upper structure by means of a sliding pivot connection of pivot axis parallel to the axis X, the pivot axis being configured to be comprised in a plane perpendicular to the axis Z comprising the center of gravity of the tank;
the fastening system further comprising symmetrically, on either side of the vertical plane of symmetry:
- at least two second symmetrical fastening devices that are configured to connect a first fastening point of the tank to the longitudinal box, the first fastening point being configured to be comprised in the horizontal median plane of the longitudinal box,
- at least two third symmetrical fastening devices that are configured to connect a second fastening point of the tank to the lower structure.

Thus, by virtue of the three fastening devices for each tank, the fastening system makes it possible to fasten one or two tanks while distributing the loads exerted by the tank or tanks.

According to a first particular feature, each of the two first fastening devices comprises a double bracket fastened to the upper structure, the double bracket comprising a first beam and a second beam forming a V, the V being comprised in a plane perpendicular to the axis X, the first beam and the second beam each comprising a first end, the first end of the first beam and the first end of the second beam meeting at a vertex of the V,
the first beam having a second end fastened to an upper end of the upper structure,
the second beam having a second end fastened to the upper structure such that the second beam is parallel to the axis Y,
the vertex of the V being configured to be fastened to a yoke of axis X fastened to the tank.

According to a second particular feature, each of the at least two second fastening devices comprises:
a first double plate in the form of a triangle comprised in a horizontal median plane of the longitudinal box, the first double plate being fastened to the longitudinal box by a fastening side of the triangle of the first double plate, the fastening side being opposite to a fastening vertex of the triangle,
two first link rods that are parallel to the axis X, the two first link rods having a first end connected to the fastening vertex of the triangle by a first pivot connection of axis Z, the two first link rods having a second end intended to be connected by a second pivot connection of axis Z to a horizontal plate fastened to the tank.

Furthermore, each of the at least two second fastening devices comprises a fastening angle iron, the fastening angle iron fastening the first double plate to a respective longitudinal plate of the longitudinal box.

According to a third particular feature, each of the at least two third fastening devices comprises:
a second double plate in the form of a triangle comprised in a vertical plane perpendicular to the axis X, the second double plate being fastened to the lower structure by a fastening side of the triangle of the second double plate, the fastening side being opposite to a fastening vertex of the triangle,
two second link rods that are parallel to the axis Y, the two second link rods having a first end connected to the fastening vertex of the triangle by a first pivot connection of axis X, the two second link rods having a second end intended to be connected by a second pivot connection of axis X to a vertical plate fastened to the tank.

In addition, the first ends of the two first link rods sandwich the fastening vertex of the triangle of the first double plate, the second ends of the two first link rods being configured to sandwich the horizontal plate fastened to the tank,
the first ends of the two second link rods sandwiching the fastening vertex of the triangle of the second double plate, the second ends of the two second link rods being configured to sandwich the vertical plate fastened to the tank.

Furthermore, the upper structure comprises a pair of upper panels that deviate symmetrically, on either side of the vertical plane of symmetry, proceeding from a respective longitudinal edge face, from the upper side of the longitudinal box as far as an upper edge, each of the upper panels comprising stiffeners that are perpendicular to the axis X, each of the two first fastening devices of each of the at least two fastening frames being fastened to a stiffener of a respective upper panel, the lower structure comprising a pair of lower panels that deviate symmetrically, on either side of the vertical plane of symmetry, proceeding from a respective longitudinal edge face, from the lower side of the longitudinal box, each of the lower panels comprising stiffeners that are perpendicular to the axis X, each of the at least two third fastening devices being fastened to a stiffener of a respective lower panel.

Furthermore, the upper structure comprises arches that are fastened to the upper edge of the upper panels so as to connect the upper panels to each other, each of the arches being comprised in a plane comprising a stiffener of each of the upper panels.

Advantageously, each of the at least two fastening frames comprises a truss between the two upper panels, the truss comprising:
- a tie beam fastened to the two upper panels in the continuation of the second beam of the double bracket of the first fastening device on either side of the vertical plane of symmetry,
- two struts that are disposed symmetrically with respect to the vertical plane of symmetry, each of the two struts having a first end fastened to an arch which is located in a plane comprising the double bracket, each of the two struts having a second end fastened to the respective upper panel.

Furthermore, the longitudinal box comprises a central web connecting the two longitudinal plates, the central web being comprised in the horizontal median plane of the longitudinal box between two first double plates of two second fastening devices that are symmetrical with respect to the vertical plane of symmetry.

According to one particular feature, the central web has two lateral edges that are parallel to the axis X and perpendicular to the axis Y, the two lateral edges being fastened to the longitudinal plates of the longitudinal box.

In addition, the longitudinal box comprises at least one pair of transverse webs associated with a central web or with each of the central webs, the pair or pairs of transverse webs comprising a first transverse web and a second transverse web connecting the two longitudinal plates on either side of the associated central web or webs along the axis X, the first transverse web and the second transverse web being perpendicular to the axis X.

The invention also relates to an aircraft fuselage comprising a fastening system as described above, the fastening system being integrated into the fuselage.

The invention also relates to an aircraft, in particular a transport plane, comprising a fuselage into which a fastening system as specified above is integrated.

BRIEF DESCRIPTION OF THE DRAWINGS

The appended figures will make it easy to understand how the invention may be implemented. In these figures, identical references denote similar elements.

DETAILED DESCRIPTION

Figure 1:
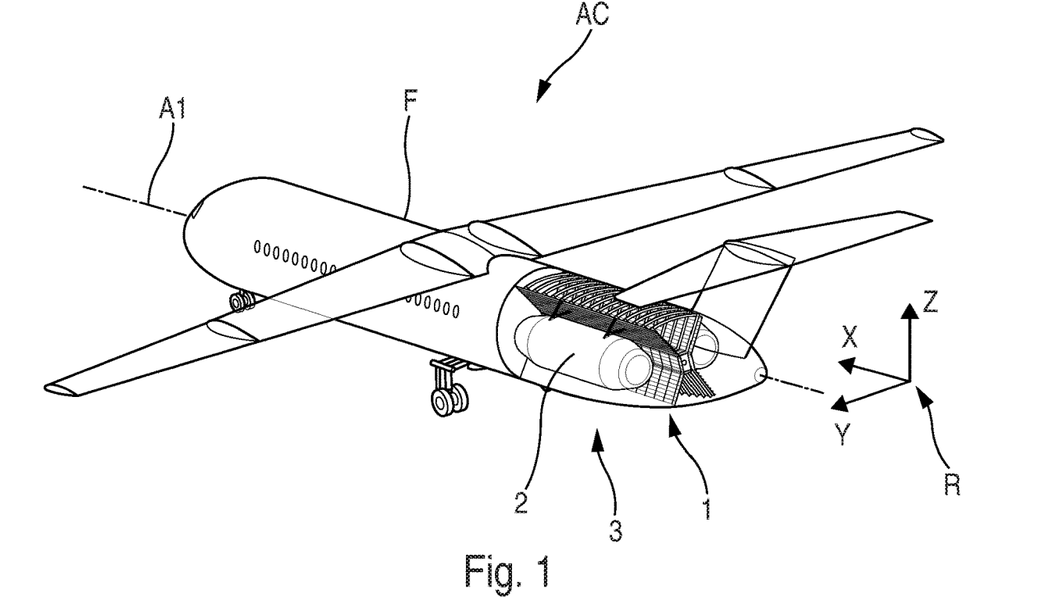
FIG. 1 shows a perspective view of an aircraft having a fuselage into which a fastening system is integrated, two tanks being fastened to said fastening system.

The fastening system 1 is intended to be integrated into the fuselage F of an aircraft AC (FIG. 1). The fastening system 1 may be secured to the fuselage F of the aircraft AC.

Figure 2:
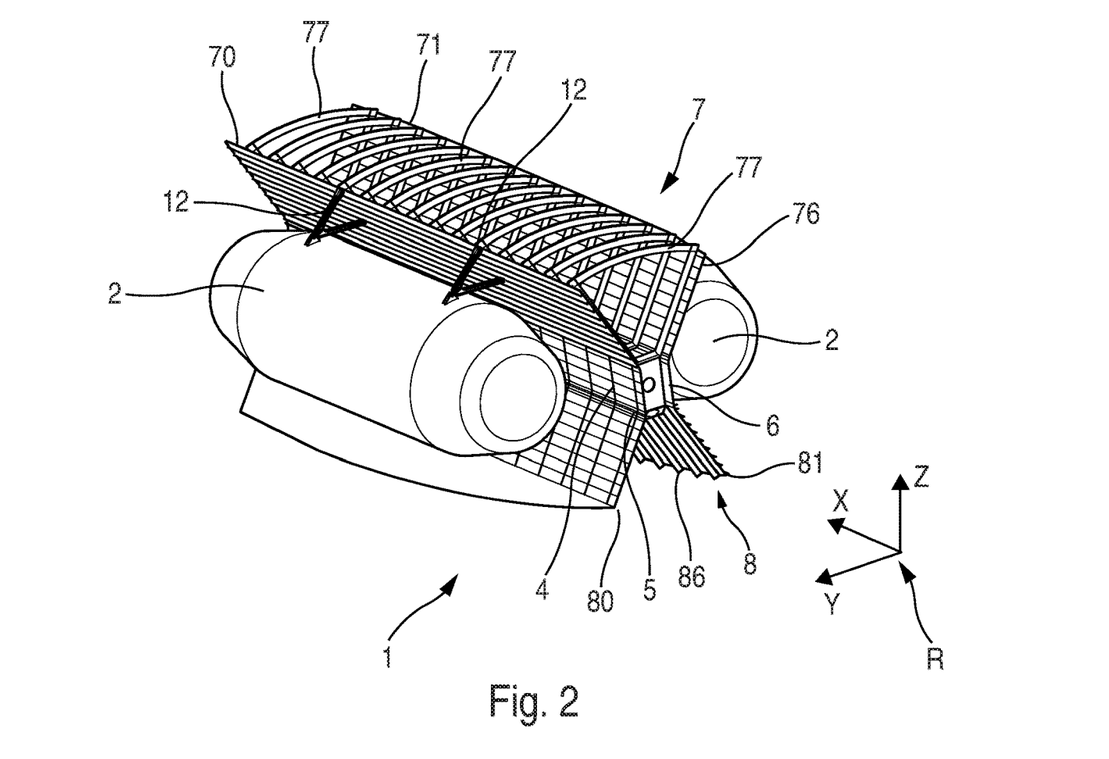
FIG. 2 shows a perspective view of a fastening system to which two tanks are fastened.

The fastening system 1 shown in FIG. 2 is linked to an orthogonal frame of reference R defined by an axis X intended to be parallel to a longitudinal axis A1 of the fuselage body 3 of the aircraft AC, into which fuselage body the fastening system 1 is intended to be integrated (FIG. 1). The orthogonal frame of reference R is also defined by an axis Y and an axis Z. The axis Y corresponds to a transverse direction of the fastening system 1 perpendicular to the axis X. The axis Y is horizontal when the aircraft AC that is intended to receive the fuselage body 3 into which the fastening system 1 is integrated is on the ground. The axis Z corresponds to the vertical direction of the fastening system 1 perpendicular to the axis X and to the axis Y. "Horizontal plane" refers to a plane parallel to the axis X and to the axis Y. The fastening system 1 comprises a vertical plane of symmetry P1. "Vertical plane of symmetry P1" refers to the plane parallel to the axis X and to the axis Z which corresponds to the vertical plane of symmetry of the fastening system 1.

The adjectives "upper" and "lower" are defined with respect to the ground along which the aircraft AC intended to receive the fastening system 1 is able to advance. An object qualified by the adjective "lower" is situated closer to the ground than an object qualified by the adjective "upper".

The adjective "lateral" qualifies a part which is situated on one side and/or the other of the vertical plane of symmetry P1.

The fastening system 1 is configured to fasten at least one tank 2 intended to contain liquid hydrogen. The fastening system 1 provides that two tanks 2 can be fastened one next to the other on either side of the vertical plane of symmetry P1. The tank or tanks 2 have a center of gravity CG. It can be considered that the center of gravity CG of the or of each of the tanks 2 remains substantially in the same position irrespective of the quantity of liquid hydrogen contained in the tank or tanks 2.

The fastening system 1 is intended to be integrated into a fuselage body 3 of an aircraft AC.

The fastening system 1 comprises a longitudinal box 4, an upper structure 7 fastened to an upper side 9 of the longitudinal box 4, a lower structure 8 fastened to a lower side 10 of the longitudinal box 4.

The longitudinal box 4 extends parallel to the axis X.

The longitudinal box 4 has a longitudinal vertical median plane P2 that is substantially coincident with the vertical plane of symmetry P1 of the fastening system 1. The longitudinal box 4 also has a horizontal median plane P3 intended to comprise the center of gravity CG of the tank or tanks 2. The longitudinal box 4 comprises at least two longitudinal plates 5 and 6 extending along the axis X parallel to the vertical plane of symmetry P1.

The longitudinal vertical median plane P2 corresponds to a vertical plane of symmetry of the longitudinal box 4 parallel to the longitudinal axis of the longitudinal box 4.

The horizontal median plane P3 corresponds to a horizontal plane of symmetry of the longitudinal box 4.

Figure 6:
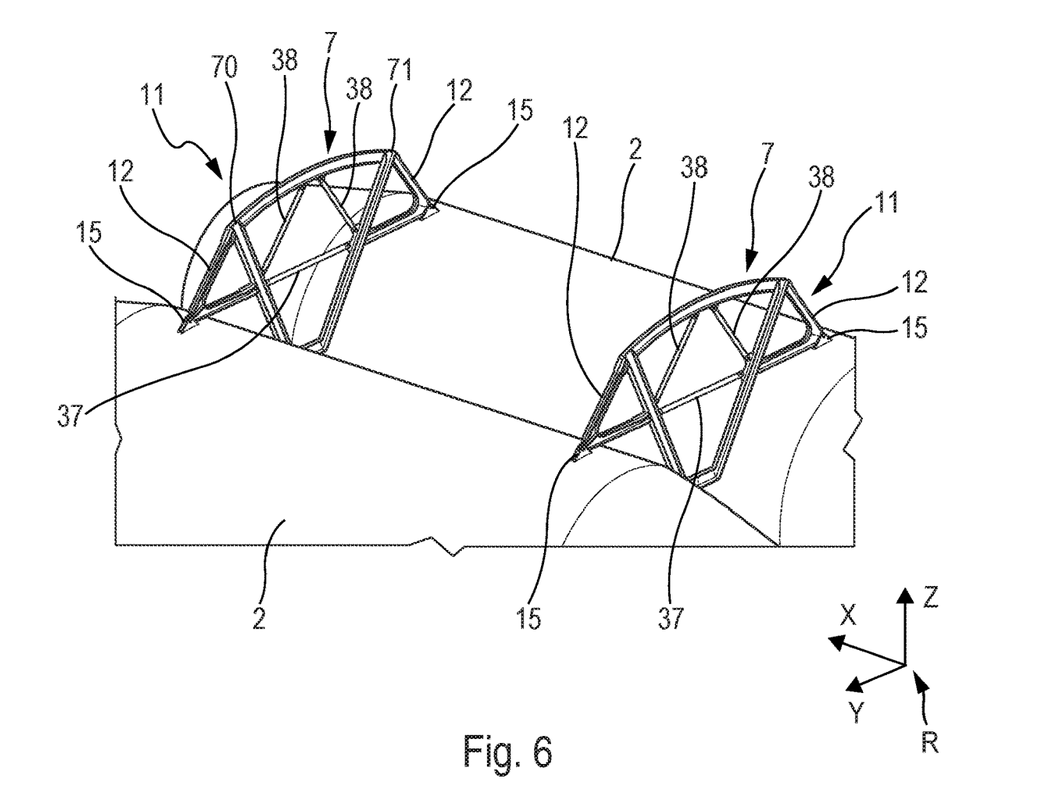
FIG. 6 shows a perspective view of two fastening frames of a fastening system to which two tanks are fastened.

The fastening system 1 also comprises at least two fastening frames 11 distributed along the axis X (FIG. 6). Each of the at least two fastening frames 11 comprises symmetrically, on either side of the vertical plane of symmetry P1, two fastening devices 12 (FIG. 3).

Figure 3:
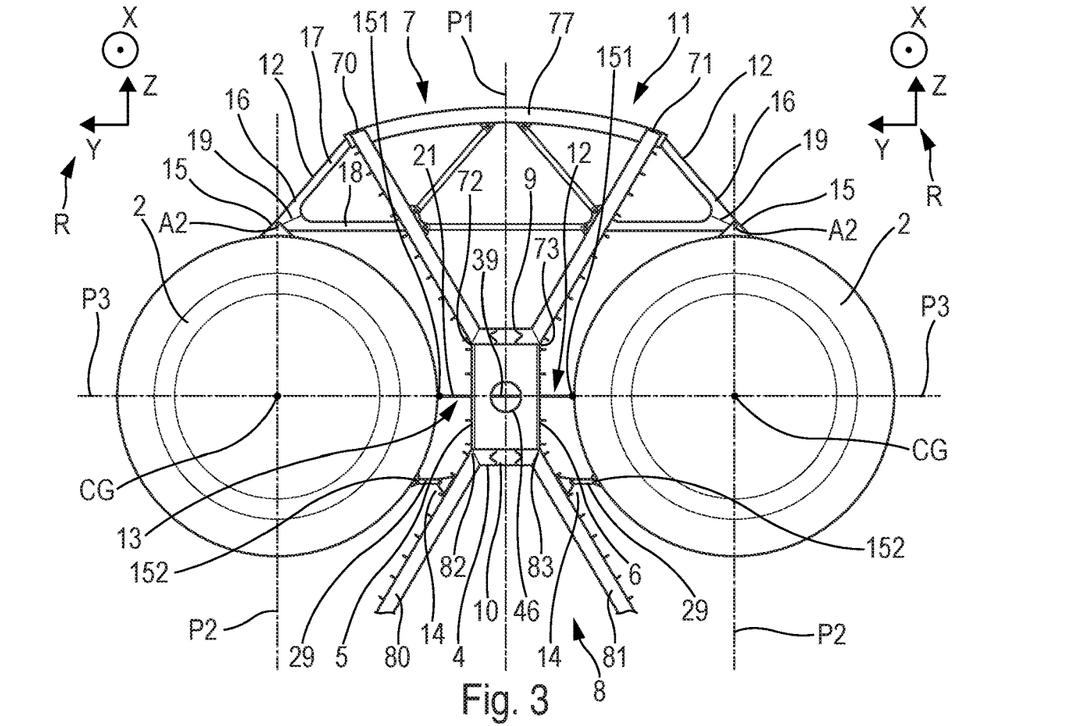
FIG. 3 shows a rear view of the fastening system.

As shown in FIG. 3, each of the at least two fastening frames 11 therefore comprises two fastening devices 12 that are disposed symmetrically in relation to one another with respect to the vertical plane of symmetry P1.

Each of the two fastening devices 12 is configured to connect a tank 2 to the upper structure 7 by means of a sliding pivot connection 15 of pivot axis A2 parallel to the axis X. The pivot axis A2 is configured to be comprised in a plane P2 perpendicular to the axis Z comprising the center of gravity CG of the tank 2.

Each of the two fastening devices 12 is configured to permit a transfer of load F6 and F7 (FIG. 5) along the axis Y and the axis Z.

According to one embodiment, each of the two fastening devices 12 comprises a double bracket 16 fastened to the upper structure 7.

Figure 4:
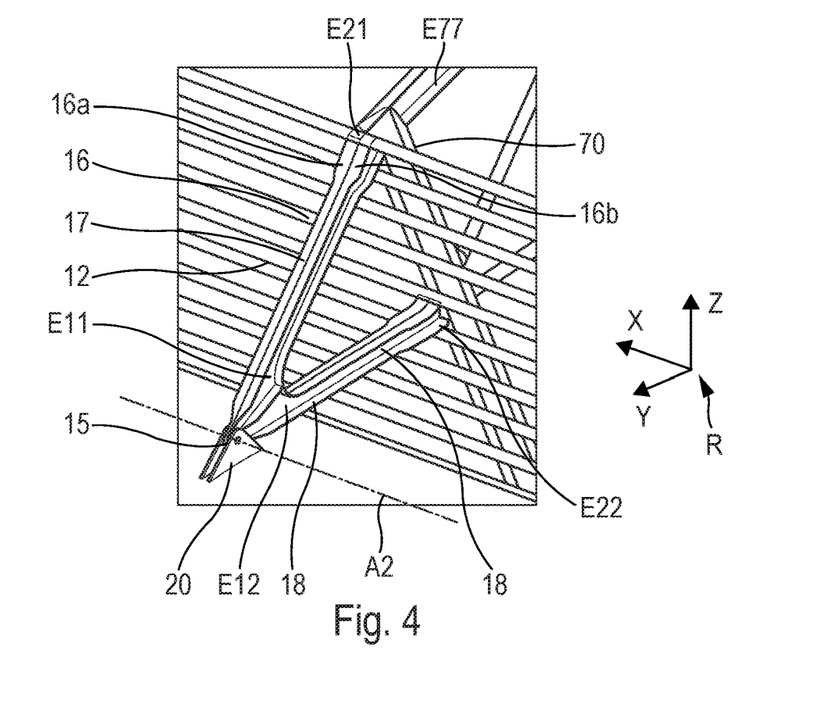
FIG. 4 shows a perspective view of a double bracket of the first fastening device fastened to a stiffener of an upper panel.

A double bracket 16 comprises two single brackets 16a and 16b that are coupled symmetrically in relation to one another with respect to a plane perpendicular to the axis X (FIG. 4). The loads F1, F2 (FIG. 5) exerted on the double bracket 16 by the tank 2 fastened to a fastening device 12 are therefore divided into two load paths: a first part of the loads F1, F2 is exerted on a first single bracket 16a and a second part of the loads F1, F2 is exerted on the second single bracket 16b. Thus, if one of the two single brackets 16a or 16b breaks, the other single bracket 16b or 16a (which is not broken) has the capacity to take up all of the loads F1 and F2. Preferably, the two single brackets 16a, 16b are not fastened together so that if a first single bracket were to break, the breakage of this first single bracket would not lead to the breakage of the second single bracket.

The double bracket 16 comprises a beam 17 and a beam 18 which together form a V. The V is comprised in a plane perpendicular to the axis X. The beam 17 comprises an end E11 and the beam 18 comprises an end E12.

The end E11 of the beam 17 and the end E12 of the beam 18 meet at a vertex 19 of the V. The vertex 19 of the V is configured to be fastened to a yoke 20 of axis X fastened to the tank 2. The beam 17 has an end E21 fastened to an upper end E7 of the upper structure 7 (FIG. 4). The beam 18 has an end E22 fastened to the upper structure 7 such that the beam 18 is substantially parallel to the axis Y.

The fastening system 1 further comprises symmetrically, on either side of the vertical plane of symmetry P1, at least two fastening devices 13 and at least two fastening devices 14. Thus, the fastening system 1 comprises at least two fastening devices 13 that are disposed symmetrically in relation to one another with respect to the vertical plane of symmetry P1 and two fastening devices 14 that are disposed symmetrically in relation to one another with respect to the vertical plane of symmetry P1.

Each of the at least two fastening devices 13 is configured to in each case connect a fastening point 151 of the tank 2 to the longitudinal box 4 (FIG. 3). The fastening point 151 is configured to be comprised in the horizontal median plane P3 of the longitudinal box 4.

Figure 7:
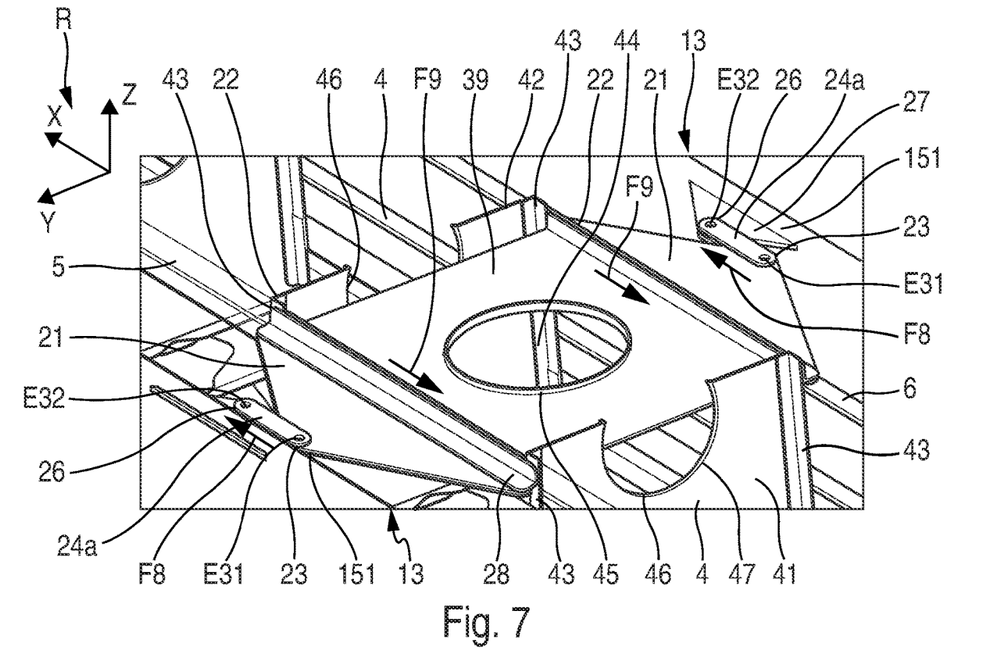
FIG. 7 shows a perspective view of a horizontal and longitudinal cross section of the longitudinal box of the fastening system, highlighting a central web, two transverse webs and the second fastening devices of a fastening frame.

Each of the at least two fastening devices 13 is configured to permit a transfer of loads F8, F9 along the axis X (FIG. 7).

Thus, the center of gravity CG of the tank 2 or of each of the two tanks 2 that are intended to be fastened to the fastening system 1 is comprised in the horizontal median plane P3 comprising the fastening point 151 of each of the at least two symmetrical fastening devices 13, and also in the plane P2 comprising the pivot axis A2 (FIG. 3). This disposition of the two planes P2 and P3 with respect to the center of gravity CG makes it possible to effectively hold the tanks 2 that are fastened to the fastening system 1.

According to one embodiment, each of the at least two fastening devices 13 comprises a double plate 21 and two link rods 24a, 24b.

Figure 8:
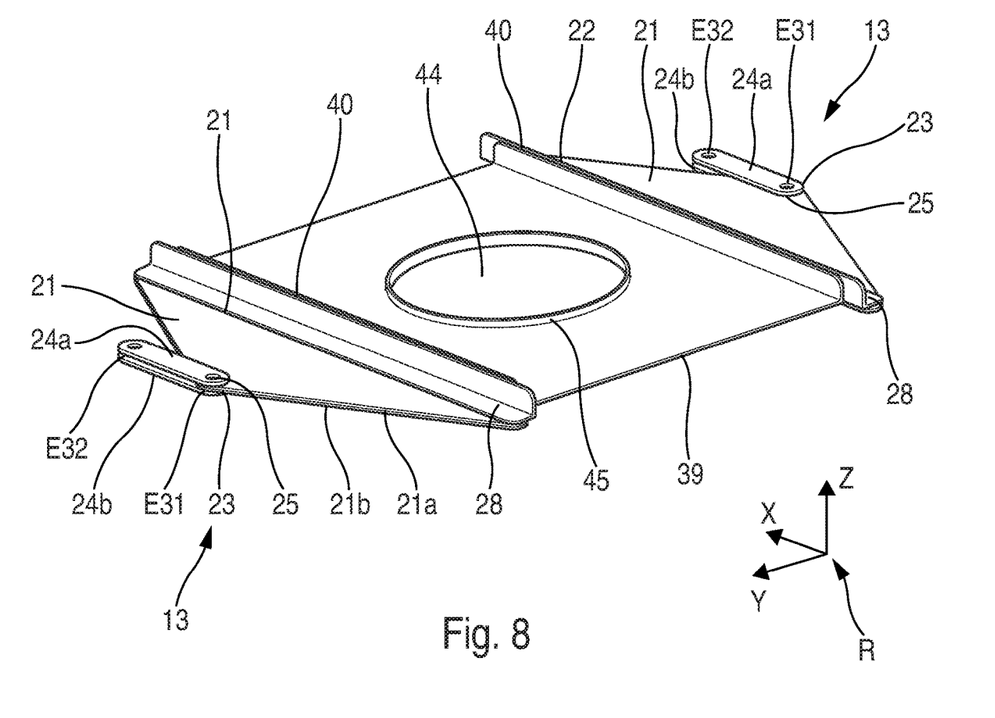
FIG. 8 shows a perspective view of a central web and of the second fastening devices of a fastening frame.

The double plate 21 is in the form of a triangle comprised in the horizontal median plane P3 of the longitudinal box 4 (FIG. 7 and FIG. 8). Each double plate 21 is fastened to the longitudinal box 4 by a fastening side 22 of the triangle of the double plate 21. This fastening side 22 is opposite to a fastening vertex 23 of the triangle of the double plate 21.

Advantageously, each of the at least two fastening devices 13 comprises a fastening angle iron 28. The fastening angle iron 28 fastens the double plate 21 of the fastening device 13 to a longitudinal plate 5, 6, respectively, of the longitudinal box 4. Thus, each of the at least two fastening devices 13, which are disposed symmetrically in relation to one another with respect to the vertical plane of symmetry P1, comprises a fastening angle iron 28 that fastens the respective double plate 21 thereof to a respective longitudinal plate 5, 6.

A double plate 21 comprises two single plates 21a and 21b that are coupled symmetrically and parallel to one another with respect to a plane perpendicular to the axis Y (FIG. 8). The loads exerted on the double plate 21 by the tank 2 fastened to the fastening device 13 are therefore divided into two load paths: a first part of the loads is exerted on a first single plate 21a and a second part of the loads is exerted on the second single plate 21b. Thus, if one of the two single plates 21a or 21b breaks, the other single plate 21b or 21a (which is not broken) has the capacity to take up all of the loads. Preferably, the two single plates 21a, 21b are not fastened together so that if a first single plate were to break, the breakage of this first single plate would not lead to the breakage of the second single plate.

The two link rods 24a, 24b have a longitudinal axis substantially parallel to the axis X. The two link rods 24a, 24b have an end E31 connected to the fastening vertex 23 of the triangle of the double plate 21 by a pivot connection 25 of axis Z. The two link rods 24a, 24b also have an end E32 intended to be connected by a pivot connection 26 of axis Z to a horizontal plate 27 fastened to the tank 2 (FIG. 7). The use of two link rods 24a and 24b makes it possible for the loads exerted on the two link rods 24a and 24b by the tank 2 fastened to the fastening device 13 to be divided into two load paths: a first part of the loads is exerted on a first link rod 24a and a second part of the loads is exerted on the second link rod 24b. Thus, if one of the two link rods 24a or 24b breaks, the other link rod 24b or 24a (which is not broken) has the capacity to take up all of the loads. Preferably, the ends E31 of the two link rods 24a and 24b sandwich the fastening vertex 23 of the triangle of the double plate 21. The ends E32 of the two link rods 24a and 24b are configured to sandwich the horizontal plate 27 fastened to the tank 2.

Each of the at least two fastening devices 14 is configured to in each case connect a fastening point 152 of the tank 2 to the lower structure 8 (FIG. 3).

Figure 9:
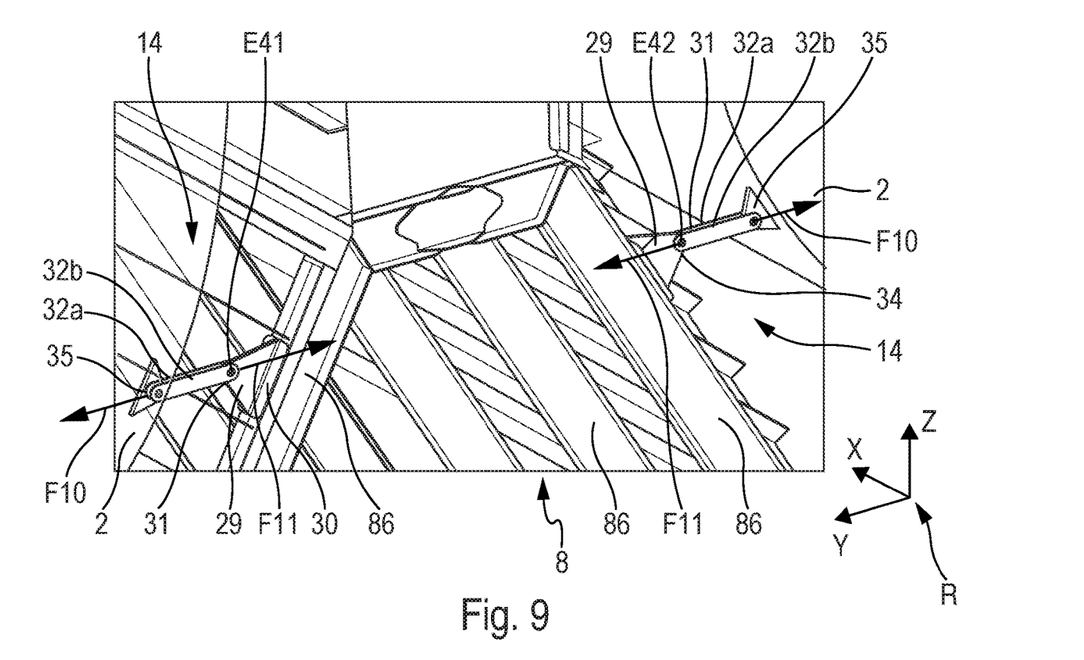
FIG. 9 shows a perspective view of the third fastening devices that are fastened to stiffeners of lower panels.

Each of the at least two fastening devices 14 is configured to permit a transfer of loads F10, F11 along the axis Y (FIG. 9).

According to one embodiment, each of the at least two fastening devices 14 comprises a double plate 29 and two link rods 32a, 32b.

The double plate 29 is in the form of a triangle comprised in a vertical plane perpendicular to the axis X. The double plate 29 is fastened to the lower structure 8 by a fastening side 30 of the triangle of the double plate 29. The fastening side 30 is opposite to a fastening vertex 31 of the triangle of the double plate 29.

Figure 10:
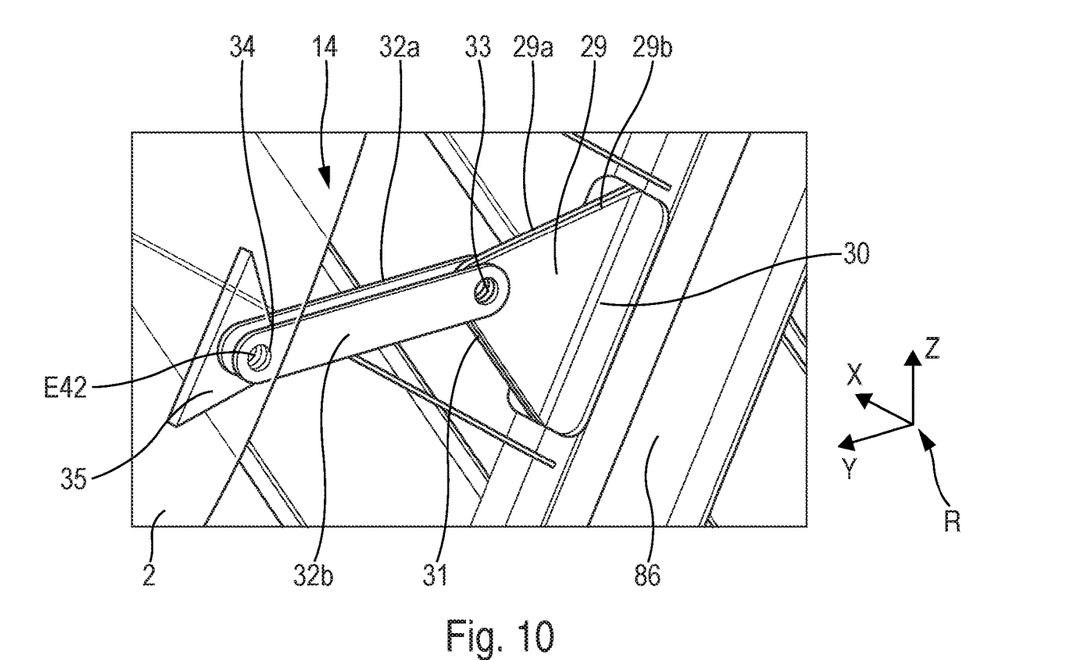
FIG. 10 shows a perspective view of a third fastening device.

As for the double plate 21, the double plate 29 comprises two single plates 29a and 29b that are coupled symmetrically and parallel to one another with respect to a plane perpendicular to the axis X (FIG. 10). The loads exerted on the double plate 29 by the tank 2 fastened to a fastening device 14 are therefore divided into two load paths: a first part of the loads is exerted on a first single plate 29a and a second part of the loads is exerted on the second single plate 29b. Thus, if one of the two single plates 29a or 29b breaks, the other single plate 29b or 29a (which is not broken) has the capacity to take up all of the loads. Preferably, the two single plates 29a, 29b are not fastened together so that if a first single plate were to break, the breakage of this first single plate would not lead to the breakage of the second single plate.

The two link rods 32a, 32b have a longitudinal axis substantially parallel to the axis Y. The two link rods 32a, 32b have an end E41 connected to the fastening vertex 31 of the triangle of the double plate 29 by a pivot connection 33 of axis X. The two link rods 32a, 32b also have an end E42 intended to be connected by a pivot connection 34 of axis X to a vertical plate 35 fastened to the tank 2 (FIG. 9 and FIG. 10). The use of two link rods 32a and 32b makes it possible for the loads F10, F11 exerted on the two link rods 32a and 32b by the tank 2 fastened to the fastening device 14 to be divided into two load paths: a first part of the loads is exerted on a first link rod 32a and a second part of the loads is exerted on the second link rod 32b. Thus, if one of the two link rods 32a or 32b breaks, the other link rod 32b or 32a (which is not broken) has the capacity to take up all of the loads. Preferably, the ends E41 of the two link rods 32a and 32b sandwich the fastening vertex 31 of the triangle of the double plate 29. The ends E42 of the two link rods 32a and 32b are configured to sandwich the vertical plate 35 fastened to the tank 2.

In a preferred embodiment, the upper structure 7 comprises a pair of upper panels 70, 71 that deviate symmetrically, on either side of the vertical plane of symmetry P1, proceeding from a respective longitudinal edge face 72, 73, from the upper side 9 of the longitudinal box 4 as far as an upper edge 74, 75.

Each of the upper panels 70, 71 comprises stiffeners 76 that are perpendicular to the axis X. Each of the two fastening devices 12 of each of the at least two fastening frames 11 is fastened to a stiffener 76 of a respective upper panel 70, 71. For example, the end E21 of the beam 17 and the end E22 of the beam 18 of a fastening device 12 are fastened to the same stiffener 76 of an upper panel 70, 71.

In this preferred embodiment, the lower structure 8 comprises a pair of lower panels 80, 81 that deviate symmetrically, on either side of the vertical plane of symmetry P1, proceeding from a respective longitudinal edge face 82, 83, from the lower side 10 of the longitudinal box 4. Each of the lower panels 80, 81 comprising stiffeners 86 that are perpendicular to the axis X. Each of the at least two fastening devices 14 is fastened to a stiffener 86 of a respective lower panel 80, 81. For example, the fastening side 30 of the triangle of the double plate 29 is fastened to a stiffener 86.

According to one embodiment, for one and the same fastening frame 11, the stiffener 86 to which a fastening device 14 is fastened is in the continuation of the stiffener 76 to which a fastening device 12 is fastened.

Furthermore, the upper structure 7 may comprise arches 77 that are fastened to the upper edge 74, 75 of the upper panels 70, 71 so as to connect the upper edges of the two upper panels 70, 71 to each other. Each of the arches 77 is comprised in a plane comprising a stiffener 76 of each of the upper panels 70, 71 (FIG. 2).

Figure 5:
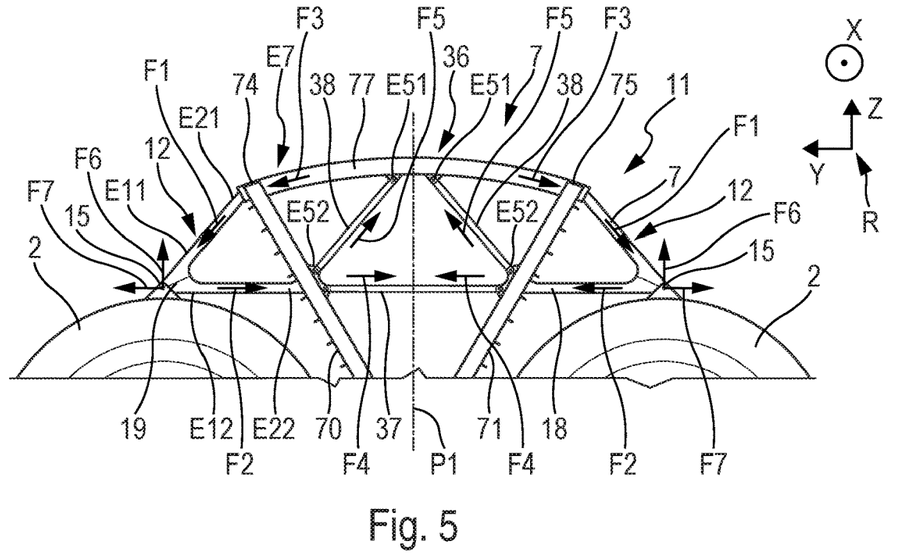
FIG. 5 shows a rear view of one embodiment of the upper structure of a fastening frame and of the first fastening device to which two tanks are fastened.

Each of the at least two fastening frames 11 may comprise a truss 36 between the two upper panels 70, 71. A truss corresponds to an assembly of beams 37 and 38 that are assembled in a vertical plane perpendicular to the axis X (FIG. 5).

The truss 36 comprises a tie beam 37 fastened to the two upper panels 70, 71 in the continuation of the beam 18 of the double bracket 16 of each fastening device 12 on either side of the vertical plane of symmetry P1.

The truss also comprises two struts 38 that are disposed symmetrically with respect to the vertical plane of symmetry P1. Each of the two struts 38 has an end E51 fastened to an arch 77 which is located in a plane comprising the double bracket 16. Each of the two struts 38 has an end E52 fastened to the respective upper panel 70, 71.

The assembly comprising a truss 36, an arch 77, the upper panels 70, 71 and the double brackets 16 forms an isostatic structure (also called "isogrid" structure) which makes it possible to distribute the loads F1, F2, F3, F4 and F5 exerted by the tank or tanks 2. This isostatic structure allows the fastening system 1 to be able to be used with two tanks 2 fastened side by side to the fastening system 1 or with a single tank 2 fastened to the fastening system 1 on one side or the other of the vertical plane of symmetry P1.

Furthermore, the longitudinal box 4 comprises at least one central web 39 connecting the two longitudinal plates 5, 6 of the longitudinal box 4. The central web 39 is comprised in the horizontal median plane P3 of the longitudinal box 4. This central web 39 is able to absorb the loads F6, F7 transmitted by the at least two fastening devices 13.

Advantageously, the central web 39 has two lateral edges 40 that are parallel to the axis X and perpendicular to the axis Y (FIG. 8). These two lateral edges 40 are fastened to the longitudinal plates 5, 6 of the longitudinal box 4.

The central web 39 may comprise a circular opening 44. Preferably, the circular opening 44 has a center that is coincident with the center of the central web 39. This circular opening 44 makes it possible to reduce the weight of the fastening frame 11. The central web 39 may be reinforced by a circular rib 45 which protrudes from a surface of the central web 39 so as to follow the edge of the circular opening 44.

Furthermore, the longitudinal box 4 comprises at least one pair of transverse webs associated with a central web 39 or with each of the central webs 39. The pair or pairs of transverse webs comprise a transverse web 41 and a transverse web 42 connecting the two longitudinal plates 5, 6 of the associated central web or webs 39 along the axis X (FIG. 7). The transverse web 41 and the transverse web 42 are perpendicular to the axis X. In order to fasten the transverse webs 41 and 42, each of the at least two fastening frames 11 may comprise at least two pairs of angle irons 43. Each pair of angle irons 43 allows the transverse webs 41 and 42 to be fastened to the two longitudinal plates 5 and 6.

At least one of the transverse webs 41, 42 may comprise a circular opening 46. Preferably, the circular opening 46 has a center that is coincident with the center of the transverse web or webs 41, 42. This circular opening 46 makes it possible to reduce the weight of the fastening system 1. The transverse web or webs 41, 42 may be reinforced by a circular rib 47 which protrudes from a surface of the transverse web or webs 41, 42 so as to follow the edge of the circular opening 46.

In one embodiment as shown in FIG. 6, the fastening system 1 comprises two fastening frames 11 that are each disposed at an end of the upper structure 7. Further fastening frames 11 may also be disposed between the two fastening frames 11 that are disposed at the ends of the upper structure 7. In this embodiment, the fastening system 1 comprises two fastening devices 13 (which are symmetrical with respect to the vertical plane of symmetry P1) and two fastening devices 14 (which are symmetrical with respect to the vertical plane of symmetry P1) that are configured such that the fastening point 151 and the fastening point 152 are also comprised substantially in a plane perpendicular to the axis X which comprises the center of gravity CG of the tank or tanks 2 that are intended to be fastened to the fastening system 1.

In another embodiment, the fastening system 1 comprises two fastening frames 11 that are each disposed at an end of the upper structure 7. Further fastening frames 11 may also be disposed between the two fastening frames 11 that are disposed at the ends of the upper structure 7. In this embodiment, for each fastening frame 11, the fastening system 1 comprises two fastening devices 13 (which are symmetrical with respect to the vertical plane of symmetry P1) associated with one fastening frame 11 and two devices 14 (which are symmetrical with respect to the vertical plane of symmetry P1) associated with one fastening frame 11. The fastening devices 13 and 14 are configured such that the fastening point 151 and the fastening point 152 of the fastening devices 13 and 14 are also comprised substantially in a plane perpendicular to the axis X which comprises the associated fastening frame 11.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fastening system configured to fasten at least one tank configured to contain liquid hydrogen, the at least one tank having a center of gravity (CG), the fastening system configured to be integrated into a fuselage body of an aircraft (AC), the fastening system having a vertical plane of symmetry (P1), the fastening system linked to an orthogonal frame of reference (R) defined by an axis X configured to be parallel to a longitudinal axis (A1) of the fuselage body, a horizontal axis Y and a vertical axis Z, wherein the fastening system comprises:
 a longitudinal box extending parallel to the axis X, the longitudinal box having a longitudinal vertical median plane (P2) coincident with the vertical plane of symmetry (P1) of the fastening system, the longitudinal box having a horizontal median plane (P3) configured to comprise the center of gravity of the at least one tank, the longitudinal box comprising at least two longitudinal plates parallel to the vertical plane of symmetry (P1),
 an upper structure fastened to an upper side of the longitudinal box,
 a lower structure fastened to a lower side of the longitudinal box, and
 at least two fastening frames distributed along the axis X, each of the at least two fastening frames comprising symmetrically, on either side of the vertical plane of symmetry (P1), two first fastening devices configured to connect the at least one tank to the upper structure by a sliding pivot connection of pivot axis (A2) parallel to the axis X, the pivot axis (A2) configured to be comprised in a plane (P2) perpendicular to the axis Z comprising the center of gravity (CG) of the tank;

the fastening system further comprising symmetrically, on either side of the vertical plane of symmetry (P1):
 at least two second symmetrical fastening devices configured to connect a first fastening point of the at least one tank to the longitudinal box, the first fastening point configured to be comprised in the horizontal median plane (P3) of the longitudinal box, and
 at least two third symmetrical fastening devices configured to connect a second fastening point of the at least one tank to the lower structure.

2. The system as claimed in claim 1,
wherein
 each of the two first fastening devices comprises a double bracket fastened to the upper structure, the double bracket comprising a first beam and a second beam forming a V, the V being comprised in a plane perpendicular to the axis X, the first beam and the second beam each comprising a first end, the first end of the first beam and the first end of the second beam meeting at a vertex of the V,
 the first beam having a second end fastened to an upper end of the upper structure,
 the second beam having a second end fastened to the upper structure such that the second beam is parallel to the axis Y,
 the vertex of the V configured to be fastened to a yoke of axis X fastened to the at least one tank.

3. The system as claimed in claim 1,
wherein each of the at least two second fastening devices comprises:
- a first double plate in the form of a triangle comprised in a horizontal median plane (P3) of the longitudinal box, the first double plate fastened to the longitudinal box by a fastening side of the triangle of the first double plate, the fastening side being opposite to a fastening vertex of the triangle,
- two first link rods parallel to the axis X, the two first link rods having a first end connected to the fastening vertex of the triangle by a first pivot connection of axis Z, the two first link rods having a second end configured to be connected by a second pivot connection of axis Z to a horizontal plate fastened to the at least one tank.

4. The system as claimed in claim 3,
wherein each of the at least two second fastening devices comprises a fastening angle iron, the fastening angle iron fastening the first double plate to a respective longitudinal plate of the longitudinal box.

5. The system as claimed in claim 1,
wherein each of the at least two third fastening devices comprises:
- a second double plate in the form of a triangle comprised in a vertical plane perpendicular to the axis X, the second double plate being fastened to the lower structure by a fastening side of the triangle of the second double plate, the fastening side being opposite to a fastening vertex of the triangle, and
- two second link rods parallel to the axis Y, the two second link rods having a first end connected to the fastening vertex of the triangle by a first pivot connection of axis X, the two second link rods having a second end configured to be connected by a second pivot connection of axis X to a vertical plate fastened to the at least one tank.

6. The system as claimed in claim 3,
wherein the first ends of the two first link rods sandwich the fastening vertex of the triangle of the first double plate, the second ends of the two first link rods configured to sandwich the horizontal plate fastened to the tank, and
wherein the first ends of the two second link rods sandwich the fastening vertex of the triangle of the second double plate, the second ends of the two second link rods configured to sandwich the vertical plate fastened to the at least one tank.

7. The system as claimed in claim 1,
wherein the upper structure comprises a pair of upper panels that deviate symmetrically, on either side of the vertical plane of symmetry (P1), proceeding from a respective longitudinal edge face, from the upper side of the longitudinal box as far as an upper edge, each of the upper panels comprising stiffeners perpendicular to the axis X, each of the two first fastening devices of each of the at least two fastening frames fastened to a stiffener of a respective upper panel, and
wherein the lower structure comprising a pair of lower panels that deviate symmetrically, on either side of the vertical plane of symmetry (P1), proceeding from a respective longitudinal edge face, from the lower side of the longitudinal box, each of the lower panels comprising stiffeners perpendicular to the axis X, each of the at least two third fastening devices fastened to a stiffener of a respective lower panel.

8. The system as claimed in claim 7,
wherein the upper structure comprises arches fastened to the upper edge of the upper panels so as to connect the upper panels to each other, each of the arches being comprised in a plane comprising a stiffener of each of the upper panels.

9. The system as claimed in claim 7,
wherein each of the at least two fastening frames comprises a truss between the two upper panels, the truss comprising:
- a tie beam fastened to the two upper panels in continuation of the second beam of the double bracket of the first fastening device on either side of the vertical plane of symmetry (P1), and
- two struts disposed symmetrically with respect to the vertical plane of symmetry (P1), each of the two struts having a first end fastened to an arch located in a plane comprising the double bracket, each of the two struts having a second end fastened to the respective upper panel.

10. The system as claimed in claim 1,
wherein the longitudinal box comprises a central web connecting the two longitudinal plates, the central web being comprised in the horizontal median plane (P3) of the longitudinal box between two first double plates of two second fastening devices that are symmetrical with respect to the vertical plane of symmetry (P1).

11. The system as claimed in claim 10,
wherein the central web has two lateral edges parallel to the axis X and perpendicular to the axis Y, the two lateral edges fastened to the longitudinal plates of the longitudinal box.

12. The system as claimed in claim 1,
wherein the longitudinal box comprises at least one pair of transverse webs associated with a central web or with each of the central webs, the pair or pairs of transverse webs comprising a first transverse web and a second transverse web connecting the two longitudinal plates on either side of the associated central web or webs along the axis X, the first transverse web and the second transverse web being perpendicular to the axis X.

13. An aircraft fuselage, comprising:
a fastening system as claimed in claim 1, the fastening system being integrated into the fuselage (F).

14. An aircraft, comprising:
a fuselage (F) into which a fastening system as claimed in claim 1 is integrated.

15. The aircraft as claimed in claim 14, further comprising:
at least one tank configured to contain liquid hydrogen, the at least one tank fastened to the fastening system.

* * * * *